United States Patent [19]
Thum et al.

[11] 3,791,931

[45] Feb. 12, 1974

[54] REAGENT AND METHOD FOR DETERMINATION OF LACTATE DEHYDROGENASE

[75] Inventors: Waldemar Thum, Tutzing; August Wilhelm Wahlefeld, Weilheim; Gotthilf Naher, Tutzing; Wolfgang Gruber, Garatshausen; Hans Mollering, Tutzing; Gunter Weimann, Percha; Hans Ulrich Bergmeyer, Tutzing, all of Germany

[73] Assignee: Boehringer Mannheim GmbH, Mannheim-Waldhof, Germany

[22] Filed: Nov. 30, 1971

[21] Appl. No.: 203,446

[30] Foreign Application Priority Data
Dec. 16, 1970 Germany.................. P 20 61 984.5

[52] U.S. Cl............. 195/103.5 R, 195/99, 195/66 R
[51] Int. Cl.............................................. G01n 31/14
[58] Field of Search.............. 195/66 R, 103.5 R, 99

[56] References Cited
OTHER PUBLICATIONS

Straub, "Biochem. J." 33:787–792 (1939)

*Primary Examiner*—Alvin E. Tanenholtz
*Assistant Examiner*—Max D. Hensley
*Attorney, Agent, or Firm*—Ralph D. Dinklage et al.

[57] ABSTRACT

Lactate dehydrogenase is quickly and reliably determined by means of a color test by contacting the test composition with the reagent comprising serum albumin, pig's heart diaphorase and nicotinamide-adenine-dinucleotide, wherein the diaphorase is preferably obtained from the protein fraction of pig's heart insoluble in 1.6 to 2.8M ammonium sulphate by treatment with 0.1 to 0.3 percent weight/volume polyethyleneimine, heating at 70° to 80° C., adsorption on a weakly acidic cation exchanger and subsequent elution.

8 Claims, No Drawings

REAGENT AND METHOD FOR DETERMINATION OF LACTATE DEHYDROGENASE

The present invention is concerned with a reagent for the determination of lactate dehydrogenase.

For the determination of lactate dehydrogenase, especially in serum, the color test of Hochella and Weinhouse (Anal, Biochem., 13, 322/1965) has been developed into a standard method which finds particular application in carrying out the determination with automatic analysis devices.

The oxidation of L-lactate to pyruvate is catalyzed by serum lactate dehydrogenase (LDH) and, at the same time, nicotinamide-adenine dinucleotide (NAD) is reduced to reduced nicotinamide-adenine-dinucleotide (NADH). This reaction can be measured photometrically in ultra-violet light. However, the use of a measurement wavelength in the visible range is advantageous. Therefore, in the above-mentioned color test, in a coupled reaction, the NADH formed is oxidized, with the help of the enzyme diaphorase, by a tetrazolium salt, usually 3-p-nitrophenyl-2-p-iodophenyl-tetrazolium chloride (INT), the tetrazolium salt thereby being reduced to a colored formazane, which can be determined photometrically in visible light (500 nm).

The determination can be represented by the following equations:

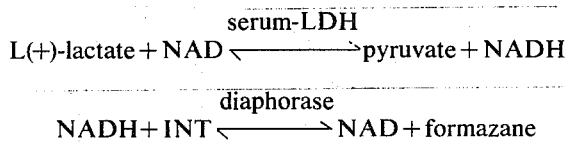

Reagent combinations containing an NAD/diaphorase mixture for carrying out this color test are commercially available. This mixture, in the form of a lyophilized powder or of a frozen solution, contains a diaphorase which is obtained from *Clostridium cluyveri*. This known reagent is not only expensive, due to the starting material from which the diaphorase is prepared, but is also insufficiently stable.

The present invention provides an improved reagent for the determination of lactate dehydrogenase by means of a color test, which reagent is substantially more stable and, in addition, can be prepared more simply and from cheaper starting material.

The reagent of the invention for the determination of lactate dehydrogenase by means of a color test, comprises serum albumin, diaphorase and nicotinamide-adenine-dinucleotide, and optionally buffer substances and stabilizers, in premixed form. The diaphorase present is obtained from the protein fraction of pig's heart which is insoluble in 1.6 to 2.8M ammonium sulphate solution by treatment with 0.1 to 0.3 percent by weight polyethyleneimine, referred to the volume of the protein solution, heating to 70° to 80° C., adsorption on a cation exchanger and subsequent elution.

The preparation of the pig's heart diaphorase contained in the reagent according to the present invention is carried out by extracting in homogenized form the press residue of pig's heart with a dilute ammonium sulphate solution, recovering from the extract the fraction which is insoluble in 1.6 to 2.8M ammonium sulphate solution, dissolving and dialysing this fraction for the removal of ammonium sulphate, mixing with polyethyleneimine, heating the supernatant for a few minutes, preferably to about 75° C., and, after removal of the precipitate, adsorbing on weakly acidic cation exchanger and, by increasing the buffer salt concentration, again eluting. The desired protein is obtained from the eluate in the usual way, for example, by precipitating out or by dissolving in the buffer desired for the reagent, adding stabilizers and possibly NAD and freeze-drying of the so-obtained reagent.

As cation exchanger, there is preferably used a carboxy-methyl ether group-carrying, three-dimensionally cross-linked dextran which is commercially obtainable, for example, under the Trade Mark "CM-Sephadex," from Pharmacia Fine Chemicals, Sweden.

As buffer, there is preferably used a potassium phosphate buffer with pH 6.5 to 7.3.

Preferred stabilizers are saccharose and alkali metal azides, both of which are expediently present in the reagent.

A preferred reagent according to the present invention comprises:
  0.003 to 0.01M potassium phosphate buffer, pH 6.5 to 7.3,
  0.5 to 5 g./liter bovine serum albumin,
  4 to 12 g./liter NAD,
  0.7 to 3 IU/ml. pig's heart diaphorase,
  3 to 20 g./liter saccharose and
  0.1 to 3 g./liter sodium azide.

An especially preferred reagent according to the present invention comprises:
  0.005M potassium phosphate buffer, pH 7.0,
  1.5 g./liter serum albumin,
  6 g./liter NAD,
  1 to 1.5 IU/ml. diaphorase,
  5 to 10 g./liter saccharose and
  1 g./liter sodium azide.

The indications "g./l." and "IU/ml." refer to the reagent in the form of a solution or to a dry powder mixture which, upon dissolving in the prescribed amount of solvent, has the given composition.

The reagent according to the present invention is not only prepared from cheaper and more easily available starting material and by a simpler process but also possesses, surprisingly, superior stability, as well as generally favorable properties in use, such as especially ready solubility.

In order to demonstrate the superior stability of the reagent according to the present invention in comparison with a known, commercially available reagent containing diaphorase obtained from *Clostridium cluyveri*, both reagents were examined for their storage stability at +40° C. in the form of final reagent solutions. At definite periods of time, the NAD content was measured enzymatically with alcohol-dehydrogenase and the diaphorase content with INT and NADH at pH 8.8 and 37.0° C. The measurements were carried out at 492 nm. Lactate-dehydrogenase, lactate and NAD were used as the NADH-regenerating system. The following Table I shows the results:

TABLE I

Stability of the final reagent solutions NAD/diaphorase (heart); NAD/diaphorase (*Cl. cluyveri*)

Storage: +4°C. (refrigerator)
test: NAD enzymatic with ADH diaphorase with INT and NADH; pH = 8.8; 37°C.; 492μ
(LDH; lactate and NAD as NADH-regenerating system)

| Storage time in days | Reagent according to the invention | | | | Known reagent | | | |
|---|---|---|---|---|---|---|---|---|
| | NAD mg/ml | Percent | Heart diaphorase U/ml | Percent | NAD mg/ml | Percent | Cl. cluyveri diaphorase u/ml | Percent |
| — | 5.12 | 100 | 1.25 ± 10% | 100 | 3.86 | 100 | 0.22 ± 10% | 100 |
| 1 | 5.19 | 101 | 1.19 | 95.5 | 3.68 | 95 | 0.21 | 95.5 |
| 14 | 5.06 | 99 | 1.40 | 112 | 3.50 | 90.5 | 0.12 | 57 |
| 21 | 5.0 | 98 | 1.35 | 107 | 2.94 | 75 | 0.15 | 71 |
| 27 | 5.0 | 98 | 1.14 | 91.5 | 3.44 | 89 | 0.10 | 47.5 |

For the further investigation of the stability of the reagent according to the present invention, the reagent was stored in the form of a lyophilizate for a comparatively long period of time at a temperature of +33° C. As an indication of the stability, there was used the remaining diaphorase activity per ml. of finished reagent solution, for which purpose 530 to 550 mg. of lyophilizate were dissolved in 40 ml. amounts of water. For the activity determination of the diaphorase, the following mixture was incubated:

Into a cuvette was pipetted, in the following succession:

| | |
|---|---|
| 0.1M lactate/0.1M tris buffer, pH 8.8 | 2.00 ml. |
| INT solution (625 mg./l.) | 0.30 ml. |
| NAD solution (1.5 g./250 ml. 0.70M potassium phosphate buffer pH 7.4) | 0.14 ml. |
| LDH solution (1 mg./ml.; 360 U/mg.) | 0.01 ml. |
| Start by addition of: | |
| NAD/diaphorase reagent according to the present invention (1:10 diluted) | 0.05 ml. |

At 37° C., the extinction difference was read off per minute at 492 nm, the kinetic being determined in the linear range.

For the calculation of the activity, an extinction coefficient of 20.4 (cm$^2$ × umol$^{-1}$) was taken for INT. The following results were obtained:

TABLE II

| storage at +33°C. days | diaphorase IU/ml. reagent |
|---|---|
| 0 | 1.0–1.1 |
| 6 | 0.77–0.85 |
| 20 | 0.78–0.86 |
| 65 | 0.75–0.83 |

The above values show that the reagent according to the present invention, even after storage for 2 months at a temperature of +33°, remains fully usable. The final reagent solution, after storage for 10 weeks at −10° C., showed a completely unchanged diaphorase activity.

In practice, the reagent according to the present invention is used as described above.

Because of its superior properties, the reagent according to the present invention is especially suitable for use in automated analysis devices and improves their field of use and their dependability.

The following Examples are given for the purpose of illustrating the present invention and should not be construed as unduly limitative thereof.

EXAMPLE 1

Preparation of Pig's Heart Diaphorase.

The press residue from 600 kg. pig's hearts was homogenized and extracted with 900 liters 1M ammonium sulphate solution. After filtering off insoluble material, ammonium sulphate was added to the extract until its molarity was 1.64M, the precipitate formed was separated off and the supernatant was mixed with further ammonium sulphate until its molarity was 2.8M. The precipitate formed was filtered off, taken up in 0.01M potassium phosphate buffer (pH 7.0) and dialyzed against the same buffer. It was then mixed with 2 vol. percent of a 10 percent by weight polyethyleneimine solution, the precipitate formed filtered off and the supernatant was heated for 5 minutes at 75° C. After separation of the precipitate formed, the supernatant was adjusted to pH 5.7 and mixed with 100 g. "CM-Sephadex C 50" anion exchanger. The anion exchanger was then filtered off, washed and eluted with 0.2M potassium phosphate buffer (pH 6.0). The diaphorase was precipitated from the eluate at pH 7.0 with ammonium sulphate, the precipitate was taken up in 0.01M potassium phosphate buffer (pH 7.0), dialysed and the dialysate mixed with the other components of the reagent according to the present invention and lyophilized.

The yield of diaphorase was 42 g. (about 170 g. lyophilizate); specific activity more than 10 IU/mg. protein.

EXAMPLE 2

Preparation of Composition of the Reagent in the form of a Solution:

100 ml. 0.005 M potassion phosphate buffer, pH 7.0, contains:

150 mg. bovine serum albumin,
600 mg. NAD,
100 IU diaphorase,
1 g. saccharose,
100 mg. sodium azide.

It will be understood that the specification and examples are illustrative but not limitative of the present invention and that other embodiments within the spirit and scope of the invention will suggest themselves to those skilled in the art.

What is claimed is:

1. Reagent for the determination of lactate dehydrogenase by means of a color test, which reagent comprises serum albumin, pig's heart diaphorase and nicotinamide-adenine-dinucleotide, wherein the diaphorase is obtained from the protein fraction of pig's heart insoluble in 1.6 to 2.8M ammonium sulphate by treatment of the insoluble protein fraction with 0.1 to 0.3 percent weight/volume polyethyleneimine, heating at 70° to 80° C, adsorption on a weakly acidic cation exchanger and subsequent elution.

2. Reagent as claimed in claim 1, wherein a buffer is additionally present.

3. Reagent as claimed in claim 1, wherein a stabilizer is additionally present.

4. Reagent as claimed in claim 2, wherein the stabilizer is saccharose.

5. Reagent as claimed in claim 2, wherein the stabilizer is alkali metal azide.

6. Reagent as claimed in claim 3, comprising buffer, pH 6.5 to 7.3,
0.5 to 5. g./l. bovine serum albumin,
4 to 12 g/l. NAD,
0.7 to 3 IU/ml. diaphorase,
3 to 20 g./l. saccharose,
0.1 to 3 g./l. azide.

7. Reagent as claimed in claim 4, comprising
0.002 to 0.01M potassium phosphate buffer, pH 7.0,
1.5 g./l. serum albumin,
6 g./l. NAD,
1 IU/ml. diaphorase,
5 to 10 g./l. saccharose,
1 g./l. sodium azide.

8. Method for the determination of lactate dehydrogenase which comprises contacting the substance to be determined with lactate and a reagent as claimed in claim 1.

* * * * *